Oct. 6, 1925.
J. C. MOORE
1,556,121
AUTOMOBILE FRAME STIFFENER
Filed Dec. 23, 1921
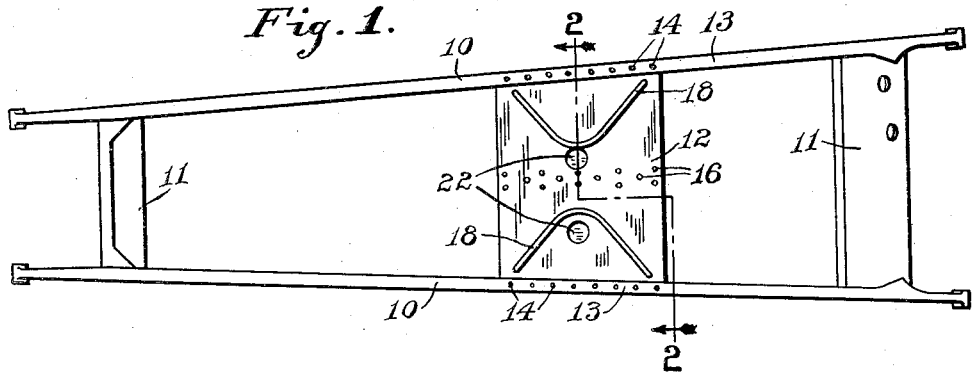
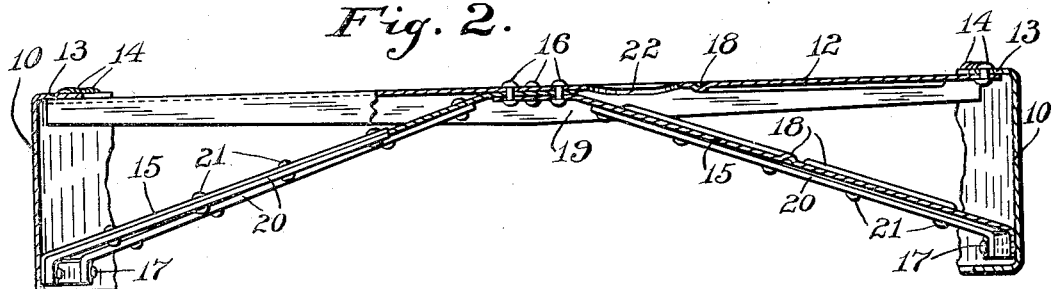
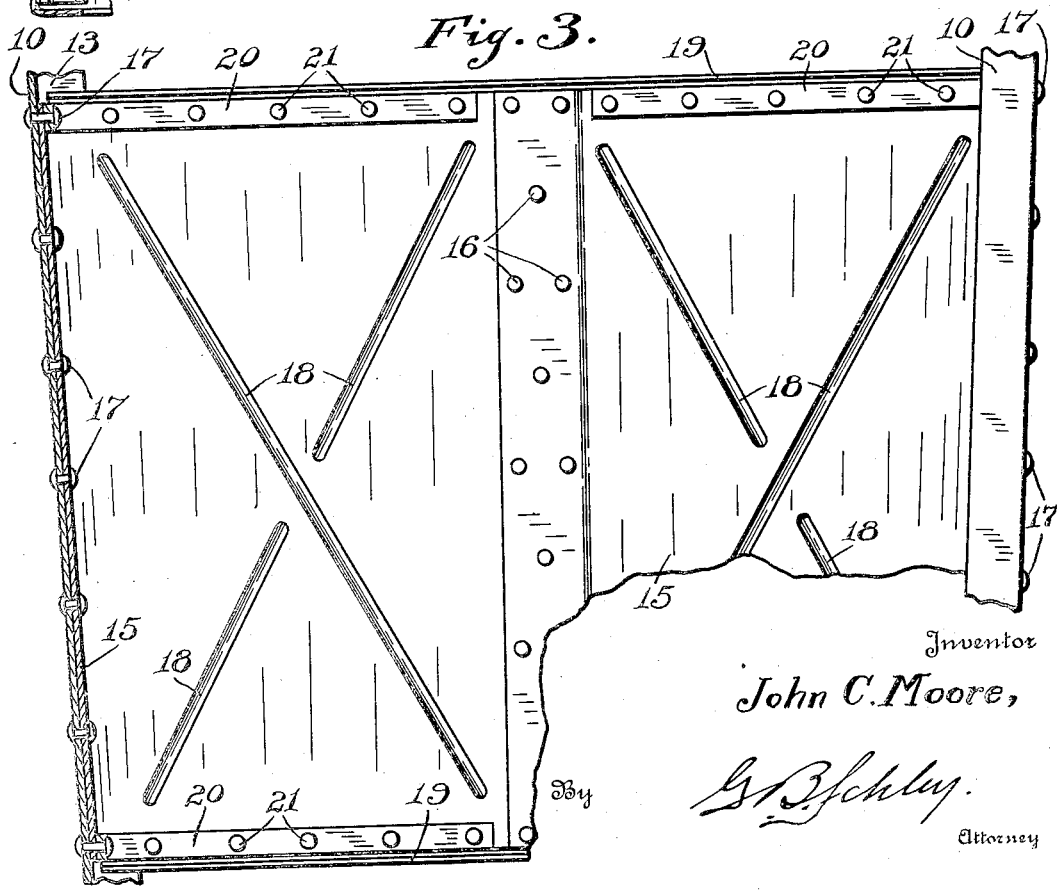
Inventor
John C. Moore,
By G. B. Schley.
Attorney Patented Oct. 6, 1925.

1,556,121

UNITED STATES PATENT OFFICE.

JOHN C. MOORE, OF CONNERSVILLE, INDIANA.

AUTOMOBILE FRAME STIFFENER.

Application filed December 23, 1921. Serial No. 524,365.

*To all whom it may concern:*

Be it known that I, JOHN C. MOORE, a citizen of the United States, residing at Connersville, in the county of Fayette and State of Indiana, have invented a new and useful Automobile Frame Stiffener, of which the following is a specification.

It is the object of my invention to stiffen the frame of an automobile against twisting, so that racking of the frame, resulting in the distortion of the body and the binding of the doors of the automobile, will be substantially prevented.

The accompanying drawing illustrates my invention: Fig. 1 is a plan of an automobile frame embodying my invention; Fig. 2 is a section on the line 2—2 of Fig. 1, on a somewhat larger scale; and Fig. 3 is a bottom plan, on the scale of Fig. 2, of the stiffening means and part of the side bars of the frame, with one side bar in section along the line of the rivets.

The automobile frame has the usual side bars 10, provided at their ends with suitable means for mounting on the usual axle-supported springs, and ordinarily cross-connected by cross members 11 near their ends. The side bars 10 are usually channel members, set on edge with their upper and lower flanges projecting inward, as is clear from Fig. 2. So far this is standard construction.

If no other means are provided, the frame composed of the side bars 10 and cross members 11 would be subject to great twisting and racking as the associated parts passed over unevennesses in the road; and this twisting and racking results in relative movements in the parts carried by the frame, and thereby not only causes many difficulties but actually shortens the life of the car. This is particularly noticeable in the higher priced closed body type of automobile.

To prevent this twisting and racking, I cross-connect the two side bars 10 by sheet-metal members which are attached to the side bars 10 along vertically separated lines of considerable length and converge and are connected together along a longitudinal line of considerable length. By reason of the rigid attachment of the sheet-metal members to the side bars along vertically separated lines, it would be necessary on such twisting for such two members to slide longitudinally relatively to each other at their meeting lines; and by preventing such sliding by a rigid interconnection of such two members at their meeting line I prevent this relative sliding and so prevent almost entirely the twisting of the frame 10—11.

A simple form for these members is shown in the drawing. There is an upper sheet-metal member 12 which connects the upper flanges 13 of the side bars 10 and is attached to each of such flanges 13 by a line of rivets 14. Two oblique lower members 15, also of sheet-metal, extend obliquely upward from lower parts of the side bars 10 to the middle of the upper sheet-metal member 12, where they overlap, the oblique members 13 being bent slightly at their lateral edges to provide flanges which lie flat against the upper sheet-metal member 12 and the vertical faces of the side bars 10, to which they are attached by lines of rivets 16 and 17 respectively; for strength, the rivets 16 are preferably arranged in a double line, as these rivets interconnect both oblique members 15 to the middle of the upper sheet-metal member 12. The manner of attachment of the oblique members 15 to the upper member 12 and of both the members to the side bars 10, may be varied from that shown, so long as the members 15 are rigidly attached to the member 12 and the members 12 and 15 are attached to the side bars on vertically separated lines. Both the upper sheet-metal member 12 and the lower oblique members 15 are provided with strengthening ribs 18, to prevent buckling of such members. In addition, to prevent bending of the upper sheet-metal member 12 along its medial line, I provide downwardly extending stiffening flanges 19 at the front and rear edges of said upper member 12, the flanges preferably being the greatest depth at the middle; these flanges 19 are formed by merely bending over portions of the sheet-metal itself. If desired, reinforcing bars 20 may be provided at the front and rear edges of the sheet-metal members, as is shown for the oblique members 15, such reinforcing bars being attached by rivets 21.

In operation, when unevennesses are encountered in the road, there is a tendency to raise one or another corner of the frame 10—11, to produce a twist in the frame.

This twist can only be accomplished, however, if the oblique members 15 slide relatively to each other and to the upper sheet-metal member 12 along their meeting line, where they are attached together by the rivets 16; for the members 12 and 15 are rigid with the side bars 10 by reason of the rows of rivets 14 and 17. The row of rivets 16, however, resists this relative longitudinal sliding, and by such resistance effectively prevent the twisting tendency above referred to from actually producing any material twisting in the frame.

The bracing structure formed by the sheet-metal members 12 and 15 is preferably located at an intermediate point in the length of the frame 10—11, as appears from Fig. 1, but this location is not essential. The sheet-metal members need not be solid members, but may be provided with any desired perforations, to permit the passage therethrough of the parts of the automobile, such as control wires or cables. Two such perforations 22 are indicated in Fig. 1, one of them also being shown in Fig. 2.

I prefer to make the members 12 and 15 single sheet-metal stampings, preferably sheet-steel, but it is not essential that they be one-piece members as they may be made in any way so long as they are stiff against distortion in their own planes, as the stresses produced in them are fundamentally in their own planes.

I claim as my invention:

1. In combination with the side bars of an automobile frame, relatively wide sheet-metal members which are rigidly attached to said side bars on vertically separated lines and converge and are attached together along a line extending longitudinally of said frame.

2. In combination with the side bars of an automobile frame, a relatively wide bracing plate rigidly attached to said side bars along lines of attachment and rigidly connecting said side bars, and a second relatively wide bracing plate rigidly attached to one of said side bars along a line of attachment and extending obliquely to and being rigidly attached to said first bracing plate along a line of attachment, said bracing plates being stiff in their own planes.

3. In combination with the side bars on an automobile frame, a relatively wide bracing plate interconnecting said two side bars and rigidly attached to both of them along longitudinal lines, and a second relatively wide bracing plate attached to each of said side bars along a longitudinal line vertically separated from the longitudinal line along which the first bracing plate is attached thereto, said second-named bracing plates extending obliquely to said first-named bracing plate and being rigidly attached thereto.

4. In combination with the side bars on an automobile frame, a relatively wide bracing plate interconnecting said two side bars and rigidly attached to both of them along longitudinal lines, and a second relatively wide bracing plate attached to each of said side bars along a longitudinal line vertically separated from the longitudinal line along which the first bracing plate is attached thereto, said second-named bracing plates extending obliquely to said first-named bracing plate and being rigidly attached thereto, said second-named bracing plates overlapping at their line of junction with the first said-named bracing plate.

5. In combination with the side bars on an automobile frame, a relatively wide sheet-metal plate extending between said side bars and rigidly connected thereto, and a relatively wide sheet-metal plate attached to a side bar along a line separated from the line on which the first plate is attached thereto, said second sheet-metal plate extending obliquely to said first plate and being rigidly attached thereto.

6. In combination with the side bars of an automobile frame, a relatively wide sheet-metal plate extending between said side bars and rigidly connected thereto, and a relatively wide sheet-metal plate attached to each of said side bars along a line separated from the line on which the first sheet-metal plate is attached thereto, each of said second sheet-metal plates extending obliquely to said first plate and being rigidly attached thereto.

7. In combination with the side bars of an automobile frame, a relatively wide sheet-metal plate extending between said side bars and rigidly connected thereto, and a relatively wide sheet-metal plate attached to each of said side bars along a line separated from the line on which the first sheet-metal plate is attached thereto, each of said second sheet-metal plates extending obliquely to said first plate and being rigidly attached thereto, said two obliquely extending plates being attached to said first plate on an intermediate longitudinal line between the said side bars.

8. In combination with the side bars of an automobile frame, a relatively wide sheet-metal plate extending between said side bars and rigidly connected thereto, and a relatively wide sheet-metal plate attached to each of said side bars along a line separated from the line on which the first sheet-metal plate is attached thereto, each of said second sheet-metal plates extending obliquely to said first plate and being rigidly attached thereto, said two obliquely extending plates being attached to said first plate on an intermediate longitudinal line between the said side bars and overlapping at said line.

9. In combination with the side bars of an automobile frame, relatively wide sheet-metal members which are rigidly attached to said side bars on separated lines and converge and are attached together along a line extending longitudinally of said frame.

10. In combination with the side bars of an automobile frame, relatively wide members rigidly attached to said side bars along separated lines and with said side bars forming one or more triangular structures rigidly attached to both side bars.

In witness whereof, I have hereunto set my hand at Indianapolis, Indiana, this 17th day of December, A. D. one thousand nine hundred and twenty-one.

JOHN C. MOORE.